United States Patent [19]

Farrell

[11] 4,351,629
[45] Sep. 28, 1982

[54] PLASTIC END CAPPING MACHINE

[76] Inventor: John J. Farrell, 40 Abby La., Greenbrook, N.J. 08812

[21] Appl. No.: 176,282

[22] Filed: Aug. 8, 1980

[51] Int. Cl.³ .......................... B29F 1/00; B29C 1/00
[52] U.S. Cl. ...................................... 425/116; 425/117; 425/125; 425/127; 425/129 R; 425/233; 425/576; 425/588; 425/468
[58] Field of Search ................... 425/110, 117, 129 R, 425/121, 123, 408, 412, 414–416, 542, 575, 576, 116, 125–128, 348 R, 348 S, 547, 567, 579, 588, 467, 468, 233; 264/513, 267, 268, DIG. 41, 259

[56] References Cited

U.S. PATENT DOCUMENTS

| | | | |
|---|---|---|---|
| 2,778,533 | 1/1957 | Savary | 264/DIG. 41 |
| 2,883,706 | 4/1959 | Quinche et al. | 264/DIG. 41 |
| 2,923,975 | 2/1960 | Voumard et al. | 264/DIG. 41 |
| 3,066,353 | 12/1962 | Marks et al. | 264/DIG. 41 |
| 3,159,701 | 12/1964 | Herter | 264/267 |
| 3,207,833 | 9/1965 | Errico | 425/125 |
| 3,244,788 | 4/1966 | Michel et al. | 264/267 |
| 3,313,875 | 4/1967 | Magerle | 264/267 |
| 3,330,006 | 7/1967 | Jenkins | 264/DIG. 41 |
| 3,717,544 | 2/1973 | Valyi | 264/513 |
| 3,878,282 | 4/1975 | Bonis et al. | 264/513 |
| 4,021,524 | 5/1977 | Grimsley | 264/DIG. 41 |

FOREIGN PATENT DOCUMENTS 1010541  11/1965  United Kingdom ....... 264/DIG. 41

OTHER PUBLICATIONS

Whittington, "Whittington's Dictionary of Plastics", Technomic Pub. Co., Stamford, Conn., (1975), pp. 179 & 180 relied on for definitions of Plasticate and Plasticize.

Primary Examiner—Willard E. Hoag
Attorney, Agent, or Firm—Marvin Feldman; Stephen E. Feldman

[57] ABSTRACT

An end capping machine is disclosed wherein a plastic end cap is formed and bonded to a cardboard sleeve so as to form an integral, wide-mouth container. Each cap is formed and thermoplastically bonded in essentially one-station of a multi-station operation. The machine of the present invention is particularly useful in forming oil cans, and eliminates the need for the conventional metal base and sides.

12 Claims, 6 Drawing Figures

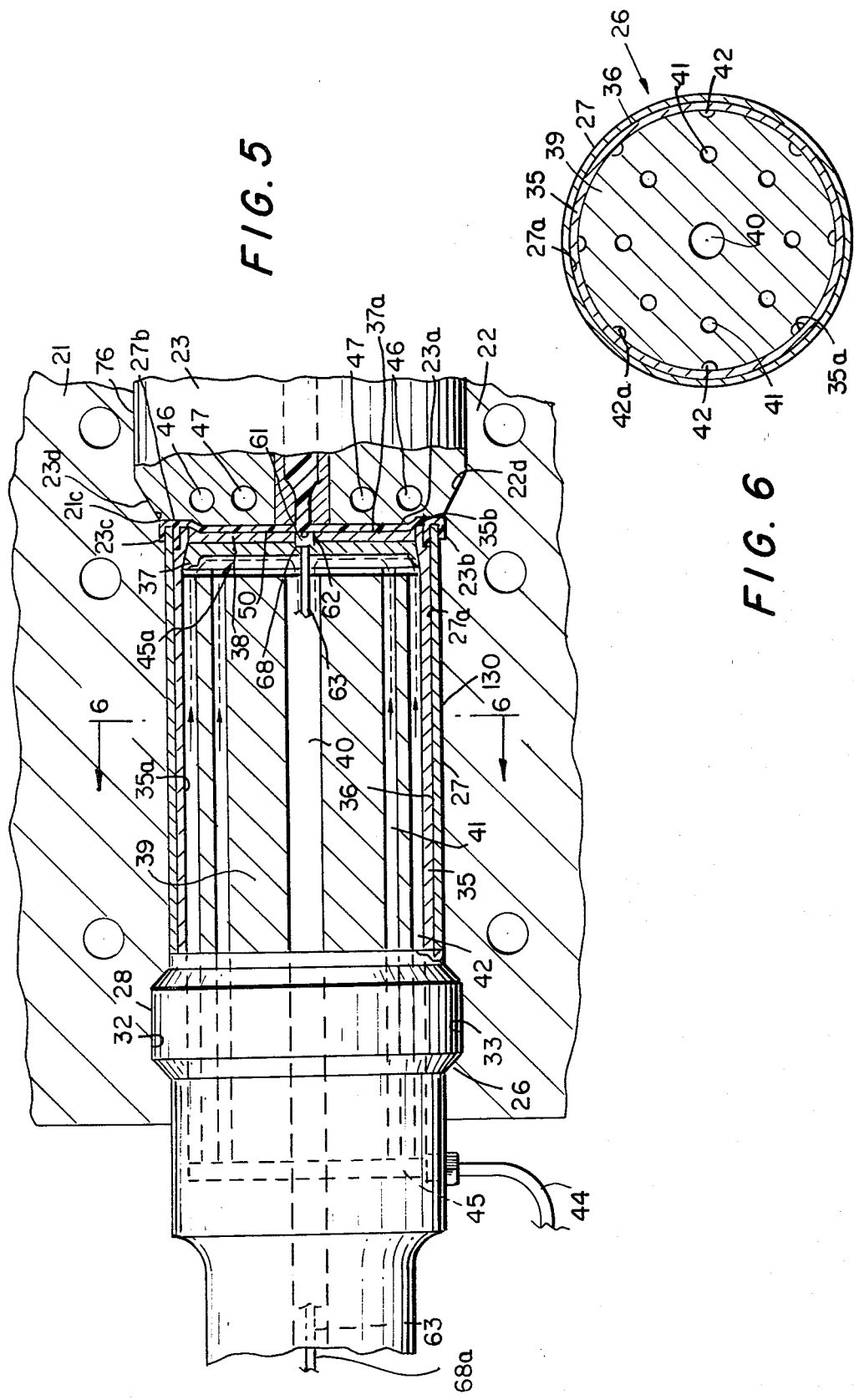

PLASTIC END CAPPING MACHINE

FIELD OF THE INVENTION

This invention relates to plastic capped machines. Specifically, this invention relates to a thermoplastic end cap on a non-metallic walled container, and to a machine for making same.

BACKGROUND AND DISCUSSION OF PRIOR ART

Heretofore certain containers, such as oil cans, were fabricated of metal sides, base and cover. The metal was costly to fabricate, and the can, which was subject to heavy duty handling and dropping, would bend or crack.

It was desired in the industry to overcome these problems by substituting a cardboard sleeve with metal end caps. While such construction avoided the bending of the sides, the end caps, particularly the bottom end cap, would still be subjected to damage. Furthermore, it was difficult to provide an adequate seal between the metal end cap and the cardboard side walls.

There is now provided by the present invention a machine for simultaneously forming and bonding a plastic end cap to a cardboard or plastic-treated cardboard sleeve.

There is also provided by the present invention, a multi-station machine for high production of plastic end-capped cardboard-walled containers.

There is also provided by the present invention a novel, fluid tight, plastic end-capped cardboard sleeve container construction.

DESCRIPTION OF THE DRAWINGS

FIG. 5 is an enlarged sectional view of one mold; and

FIG. 6 is a partial sectional view taken along line 6—6 of FIG. 5.

DESCRIPTION OF THE PREFERRED EMBODIMENTS

Figure 1:
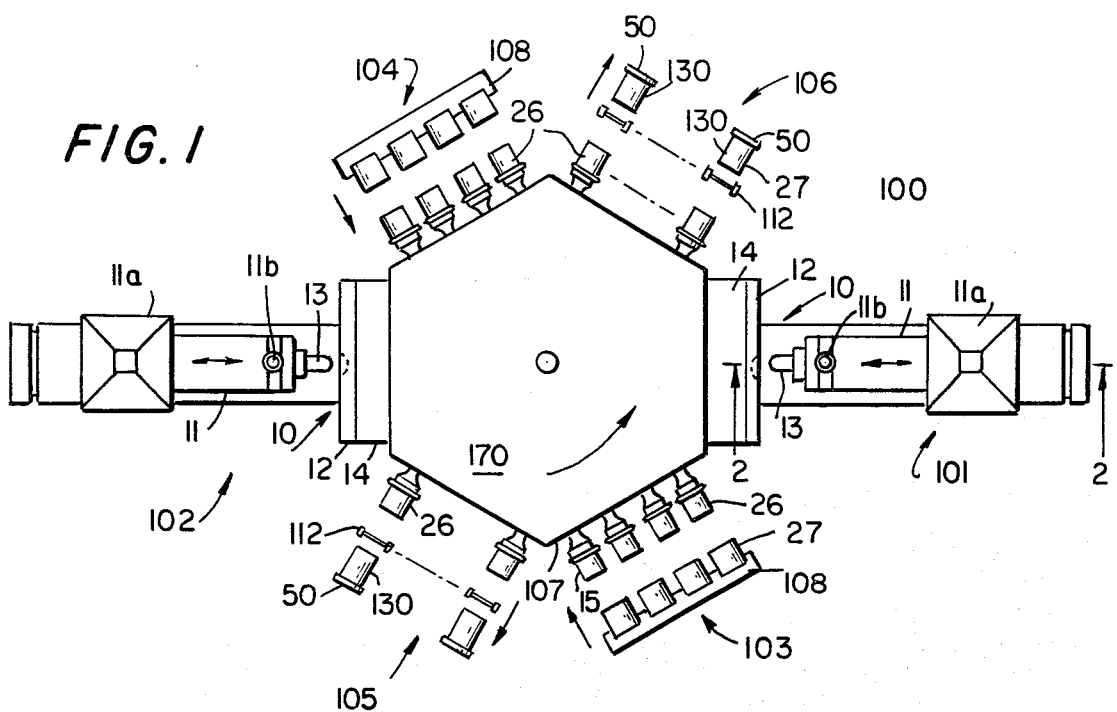
FIG. 1 is a top view of a multi-station machine embodying the present invention.
Figure 2:
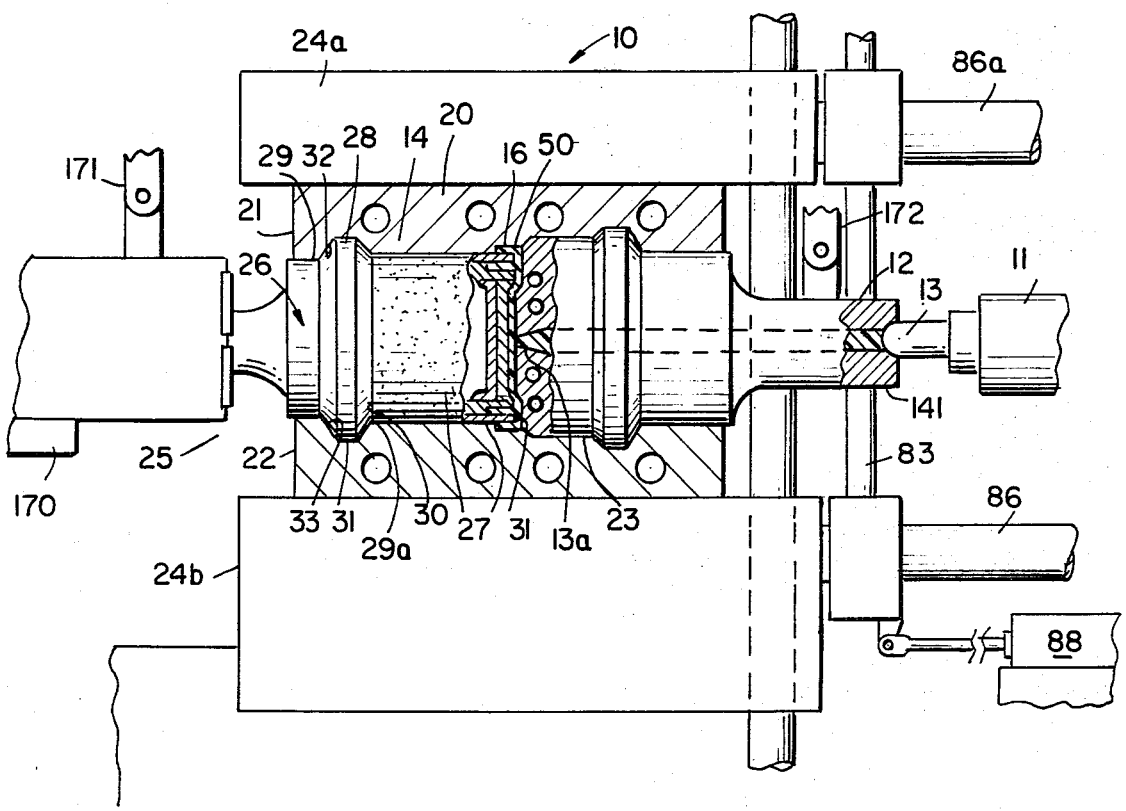
FIG. 2 is a partial enlarged elevational view taken along line 2—2 of FIG. 1.

Referring to the FIGURES there is shown the machine of the present invention generally referred to by numeral 10. Machine 10, in broad terms, comprises a plasticizer and injector 11, hopper 11a, manifold 12, nozzle 13, main mold assembly 14, end mold assembly 23, and core rod 26. Plasticizer 11, manifold 12 and nozzle 13 may be of conventional construction as is well known in the art. The plasticizer 11 is mounted to reciprocate in relationship to the main mold assembly 14.

In the construction of the machine of the present invention it is desirable that the plasticizer assembly be high volume and quick acting. Plasticizer assemblies including a time saver 11b device which may be suitable for use in the present invention are as shown in my U.S. Pat. No. 3,709,644, granted Jan. 9, 1973, and U.S. Pat. No. 28,721, dated Feb. 24, 1976.

Manifold 12 distributes the molten thermoplastic from nozzle 13 to individual mold nozzles 13a (typical) as well as to similar nozzles for a plurality of four like molds arranged in parallel.

Nozzle 13a distributes the fluent thermoplastic under pressure to cavity 16 formed in mold 20 so as to fill the entire cavity 16. Mold 20 comprises a three piece mold, namely upper mold section 21, lower mold section 22, and end cap mold section 23. Upper mold section 21 and lower mold section 22 are respectively mounted to platens 24a and 24b so as to be separable for insertion and removal of sleeved core rod assembly 25, as will be more fully explained hereinafter. End cap mold section 23 is mounted to frame 141, which is mounted in vertical bars which, in turn, are mounted to hydraulic cylinder assembly 88 so that after reciprocal movement of the plasticizer 11 away from mold section 23, the manifold 12 and mold section 23 reciprocate by action of cylinder 88. This reciprocation of first the plasticizer 11 and then the mold section 23, as is further discussed hereinafter, causes (1) engagement of the nozzle with the closed mold for injection molding, (2) completes the formation of cavity 16, and (3) permits the plasticizer and end section assembly to clear the main mold assembly, so as to permit indexing of the core rod to the stripping station.

Plastic end cap 50 is formed in cavity 16. Core rod assembly 25 comprises core rod 26 onto which a plastic-impregnated cardboard sleeve 27 is slidably received. A thrust plate or collar 28 is formed at end 29 of core rod 26. Collar 28 is fixedly attached to core rod 26 and is formed with annular ring 29a for abutting end 30 of sleeve 27, with end 31 of sleeve 27 being disposed within cavity 16. Annular ring 29 takes up the thrust exerted on the sleeve by the fluent thermoplastic under the high injection molding pressures. Collar 28 is also formed with annular seat 31, which mates with recessed sections 32 and 33 of mold sections 21 and 22, respectively. In this manner of construction, mold sections 32 and 33 are accurately seated and positively retain sleeve 27 between mold sections 21, 22, collar 28 and core rod 26, under the extremely high injection molding pressures required to form the end cap 50 on sleeve 27.

Referring specifically to FIGS. 5 and 6, core rod 26 comprises outer pipe section 35 with outer cylindrical surface 36 for slidably receiving inside cylindrical surface 27a of sleeve 27. A pair of end plates 37 and 38 are welded to inside surface 35a of pipe 35 to form a fluid tight closed end portion of the core rod. Surface 37a of end plate 37 forms part of cavity 16, and annular surface 35b, sleeve annular end surface 27b, surfaces 23a, 23b and 23c comprise the remaining parts that form cavity 16.

Core rod 26 is also formed with cylindrical block 39 which is fixedly mounted with pipe section 35. As best shown in FIG. 6, block 39 is formed with a central axial conduit 40 and a first and second plurality of radially disposed conduits 41 (typical) and 42 (typical). Surfaces 42a of block 39 in combination with inside surface 35a of pipe 35 actually form the second conduits 42. A cooling fluid is introduced through hose 44 and manifold 45, so as to be distributed through conduits 41 and 42, and into well 45a and then out through axial conduit 40. In this manner of construction the side of cavity 16 adjacent sleeve 27 is cooled. Mold section 23 is formed with a plurality of inlet orifices 46 to set the thermoplastic material and outlet orifices 47 so as to provide cooling fluid to the other side of cavity 16. Mold end section 23 is formed with a tapered portion 23d which seats under a tapered seat formed by portions 21c and 22c of dies 21 and 22, respectively.

Once cap end 50 is formed and sufficiently cooled so that container 130 can be free-standing, plasticizer 11 is moved axially away from mold end portion 23 by hydraulic means (not shown). Upper platen 24a is then moved upwardly, with the indexing of table 170 and end portion 23 moving upwardly in cooperation therewith. Through cooperative half-travel linkages 171 and 172, core rod 26 and mold end 23, respectively, move half the distance of travel of the upper platen 24a, as will be further discussed hereinafter.

Bottom die and lower mold section 22 and 24b, respectively remain fixed during the upward travel of the upper mold, core rod and mold end portion. With the mold sections fully parted, the upper mold section trips a limit switch (not shown) to actuate a cylinder 88, so that end portion 23 is moved axially away from core rod 26 to clear the indexing table and molds.

In this manner of construction, the core rod 26 and formed container 50 are free to be indexed to the stripping station for removal of the container 130.

An air valve 61 (FIG. 5) is mounted in end plate portion 62. Valve 61 is of fluid-tight construction so as to prevent molten thermoplastic of end cap 50 from entering the valve. An air supply hose 63 is connected to valve 61 at end 68 while the other end 68a is connected to a selectively operable high pressure air supply (not shown). Once end cap 50 is formed and cooled, and the mold disassembled, air is provided to and through valve 61 to assist in the removal of the container. This insures a positive action for stripping the container in a high speed operation.

Figure 3:
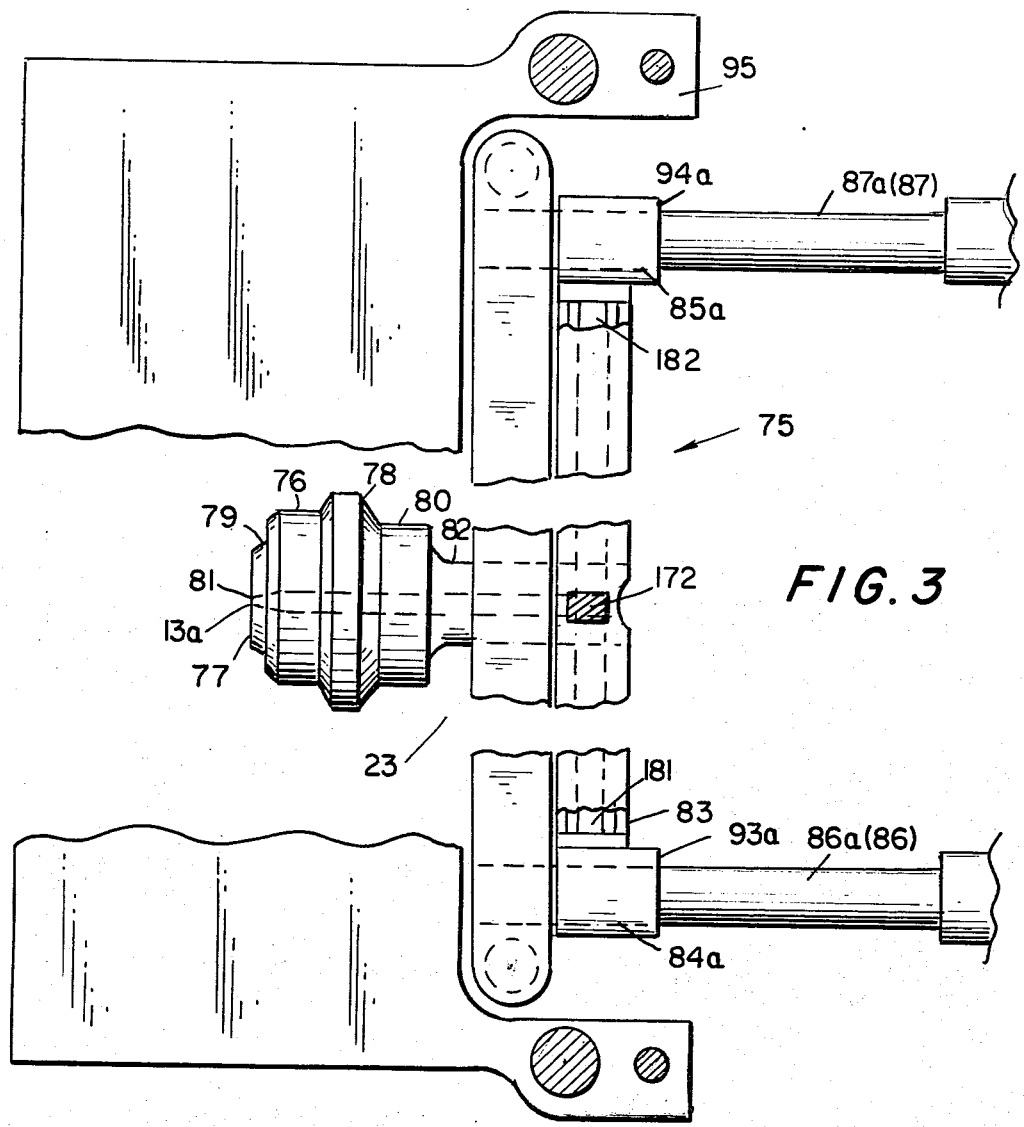
FIG. 3 is a fragmentary plan view of the end mold of FIG. 2.
Figure 4:
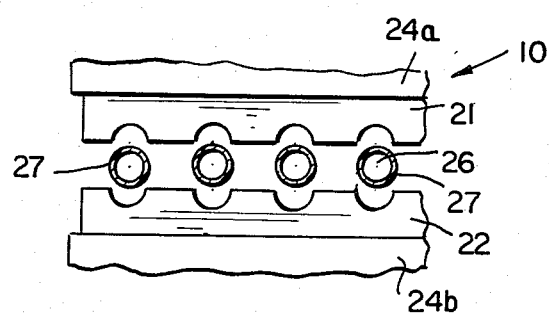
FIG. 4 is a fragmentary sectional view taken along line 4—4 of FIG. 1, but just prior to the molds being closed.

Referring to FIG. 3, there is shown the end mold assembly 75 in main support frame 95 for mounting movable mold end assembly or portion 23. Mold end assembly 23 is formed with a forward cylindrical portion 76 having a protruding portion 77 for in part forming the cavity 16 into which end cap 50 is molded. A second radially disposed V-shaped flange or seat 78 is fixedly formed on or mounted to cylindrical portion 76. The forward end 79 of mold assembly 23 is formed with an orifice 81 from which the fluent thermoplastic material is injected from plasticizer 14 into the end cap cavity 16. A rearward cylindrical portion 80 is connected through member 82 to cross frame 83. The rearward end 96 of mold portion 23 is formed with nozzle seat 98 for mounting plasticizer nozzle 13. Frame 83 extends transversely across the side of the machine and the ends 91 and 92 are mounted in collars 84 and 85, which collars slidably engage parallel, spaced horizontal bars or rods 86, 87, 86a, 87a through linear bearings 93, 94 and 93a, 94a. A retractably extendable cylinder 88 is mounted between movable collar 84 and support collar 89 on the lower horizontal bar 86, whereby with extension and retraction of cylinder 88, the frame 83 moves the assembly end mold 23 into or out of engagement with the remainder of the mold assembly. Thus, horizontal bars 86, 87 are fixed adjacent the mold but partially fixedly mounted at collar 89 so as to permit lateral expansion to compensate for heat expansion to avoid damage to bearings 93, 94.

Frame 83 is in turn connected to upper platen 24a, by conventional half-travel linkage 172 so that with raising of the upper platen, frame 83 and end mold 23 are simultaneously raised half the distance of travel of the upper platen, at which point a stop (not shown) prevents frame 83 from any further upward travel. Frame 83 is mounted to collars 84, 85, 84a, 85a by bearings 181, 182. In this manner of construction, mold end assembly 23 and frame 83 has two degrees of freedom of travel, to wit, horizontal motion through the action of cylinder 88 through linear bearings 93, 93a, 94 and 94a, and vertical motion by linkage 172 through bearings 181, 182. The core rod 26 is likewise connected by a half-travel linkage. Once the upper platen is at its limit of upward travel, a limit switch (not shown) is engaged which actuates cylinder 88 so as to retract the cylinder and, in turn, move frame 83 with attached end mold 23 away from the molded end cap 50.

The upper platen 24a is interconnected to the index table through conventional half-travel linkages 171, 172, so that with raising of the mold platen 24a the core rod 26 lift free of lower mold 22.

In this manner of construction, core rod 26 with sleeve 27 are indexed to the injection molding station and upon completion of this indexing, cylinder 88 is activated to extend end portion 23 in alignment with the core rod 26. With full extension of the end portion 23, cavity 16 is formed and then the upper mold is lowered so that the two radial flanges or seats are secured between the upper and lower molds. With the molds closed and the core rods and mold end sections secured, the injection molding operation is initiated. Upon completion of the injection molding and cooling of the formed cap on the sleeve, the upper platen is raised with concommitant half raising of the core rod and end portion through half-travel linkages. Upon full raising of the upper platen 24a, the plasticizer is first retracted on its support table, and then the end portion cylinder 88 is actuated to move the end portion 23 clear of the core rod. This permits indexing of the core rod with the formed container thereon to the stripping station.

It is to be borne in mind that in the injection molding operations the formed plastic end cap 50 is thermoplastically bonded to the plastic impregnated cardboard sleeve so as to form an integrally bonded container 130. The formed open wide-mouth container may be further capped by conventional metal lids or a pre-formed plastic cover can be thermoplastically heat sealed to the free end of the former container.

It is within the contemplation of the present invention that the machine of the present invention may be used in a piggyback operation, i.e., with two indexing tables and two sets of core rods. The molds are then formed into upper, middle and lower mold portions. There would, of course, then be two end sections and plasticizer nozzles cooperating therewith. With the opening of the upper platen and mold section, the indexing tables, cores and mold end portions are concommitently moved upward until the bottom mold portion is cleared. Then the lower table and lower end portion engages stops to limit their movement, and the middle section continues further upward to clear the radially extending portions of the core rods. At this point the middle portion is stopped and the upper mold, index upper table and lower end portion continue until a next stop at which point only the upper mold continues upwardly. Once the molds are fully opened then the upper and lower end portions can simultaneously be moved away from the core rods so as to clear both upper and lower molds as well as the intermediate mold in horizontal indexing.

Referring specifically to FIG. 1, there is shown a six-station machine 100, comprising oppositely disposed injection molding stations 101, 102 having machine 10 of present invention, sleeve loading stations 103, 104 and container discharge stations 105, 106. An indexable head 107, having core rod 26 rotatably indexed on table 170 from stations 103, 104 to stations 101, 102, and in turn to stations 105, 106 and then back to stations 103, 104.

At stations 103, 104, sleeves 27 are inserted on core rod 26 by automatic or semi-automatic loaders 108, such sleeve loaders being well known in the art. The sleeve-loaded core rods are then indexed to the injection molding stations 101, 102, whereat end caps 50 are formed and bonded to sleeve 27 to form containers 51, as discussed at length hereinbefore. The plasticizer 11 and mold end portions 23 are sequentially retracted radially outwardly to clear the core rods and containers, so as to then be indexed to stations 105, 106. At stations 105, 106, the containers are stripped from the core rods by action of a stripper plate 112, with optionally an air strip assist by valves 61 (FIG. 5).

In this manner of construction, a high production cycle is achieved by dual opposing simultaneous operations, with the production cycle being only several seconds. It is therefore within the contemplation of the invention to achieve high rates of production of oil cans with a single production machine.

Another aspect of the present invention comprises the formed injection molded plastic end capped container itself. Container 130 comprises plastic treated cardboard sleeve 27 with end cap 50 integrally formed thereon. End cap 50 is formed with cylindrical upwardly extending portions 120 and 121 on the outside and inside of the sleeve, respectively, with inside portion 121 extending further into the sleeve than outside portion 120. A flat circular end portion 122 extends across portion 121, and 122 is recessed from sleeve end surface 27b. By this manner of construction an integral fluid-tight seal is provided which can withstand the abuse of normal stocking and handling operations.

Thermoplastic materials is useful pursuant to the present invention as both the injection molded fluent material to form the cap, as well as the sleeve impregnation material, include homopolymers and copolymers of the polyolefins (e.g., polyethylene, polypropylene); polyvinyls (e.g., polyvinylacetate, polyvinyl chloride); polyethylene terephthalate; polyvinylidine chloride, acrylics (e.g., polymethylmethacrylate); and the like. Where the thermoplastic material is used for impregnation of the cardboard sleeve, it is contemplated that the thermoplastic contains plasticizers as well.

Although preferred illustrative embodiments of the invention have been shown and described, it is to be understood that various modifications and substitutions may be made by those skilled in the art without departing from the novel spirit and scope of the present invention.

What is claimed is:

1. An end capping machine for making an integral, wide mouth container, said machine comprising a head having means to rotatably index said head at a plurality of stations; a plurality of core rods mounted on and outwardly disposed from said head so as to be indexed at said stations, said stations comprising a first station comprising means to load sleeves on said core rods, a second station comprising means to injection mold a thermoplastic end cap on first ends of said sleeves so as to form containers, and a third station comprising means to unload said containers, further comprising a core rod onto which said sleeve is inserted, said core rod being disposed within the mold, said core rod further comprising an annular member disposed around the periphery of the core rod and extending radially outwardly from said core rod and being formed on one portion to engage the other end of the sleeve so as to take up the thrust of the injection molding of thermoplastic onto the sleeve, said mold comprising partible sections and means to open and close said partible sections, whereby said sleeve is held on said core rod between the closed partible sections, said mold sections being formed with recessed portions so as to contactingly engage said annular member, said member being formed with a second portion so as to comprise seating means for said partible mold sections, said mold being formed with an annular portion disposed radially outwardly from said one end of said sleeve so as to provide a cavity at both the first end and outside periphery of said sleeve adjacent said first end, whereby thermoplastic flows into the cavity and around the first end of said sleeve so as to be formed and bonded to the sleeve, thereby providing an integral wide-mouth container at said second station.

2. The machine of claim 1, further comprising a plurality of partible molds at said second station and means to close said molds on said sleeves and core rods, each of said molds forming a cavity at one end of the sleeve in which fluent thermoplastic material is received.

3. The machine of claim 1, said core rods comprising means to permit flow of a cooling fluid through said core rod.

4. The end capping machine of claim 1, said indexing head comprising six sides each having a plurality of core rods outwardly disposed therefrom, and said stations comprising a second sleeve loading station, a second injection molding station and a second container unloading station, each of said respective second stations being disposed on opposite sides of said head from said respective first said stations.

5. The machine of claim 1, said mold comprising an end portion disposed adjacent said sleeve end, and said means to injection mold comprising a plasticizer and means to mount said plasticizer to the end part of said partible mold, and further comprising means to retract said plasticizer and mold end portion after the thermoplastic end cap is formed on the sleeve.

6. The machine of claim 5, further comprising means to provide release of said formed end cap from said mold end portion.

7. An end capping machine for making an integral wide-mouth container, said machine comprising an injection mold, and means to hold a sleeve within the injection mold, said mold being formed with a mold cavity disposed at a first end of said sleeve, and means to injection mold a thermoplastic material into said cavity, said means to hold said sleeve further comprising a core rod onto which said sleeve is received, said core rod further comprising an annular member disposed around the periphery of the core rod and extending radially outwardly from said core rod and being formed in one portion to engage the other end of the sleeve so as to take up the thrust of the injection molding of thermoplastic material onto the sleeve, said mold further comprising partible sections and means to open and close said partible sections, whereby said sleeve is held on said core rod between the closed partible mold sections, said mold sections being formed with recessed portions so as to contactingly engage said annular member in the closed mold, said annular member having a second portion comprising seating means for said partible mold recessed sections, said mold being formed so as to be spacedly disposed radially outwardly from said first end of said sleeve so as to provide an annular cavity at both the first end and the adjacent outside periphery of said sleeve, whereby injected thermoplastic material flows into the cavity and around the first end of said sleeve so as to be formed and bonded to the end and adjacent periphery of the sleeve so as to form an integral end cap on said sleeve in the mold, thereby providing a wide-mouth container.

8. The end capping machine of claim 7, said second portion of said member being formed with a taper, and said partible mold section being formed with tapered grooves as as to be seated on said second portions.

9. The machine of claim 7, said core rod being formed with channels into which cooling fluid flows.

10. The machine of claim 7, said mold being formed so as to provide a recessed end cap.

11. The end capping machine of claim 7, said means to injection mold comprising an annular member disposed on said means and extending radially outward, said partible mold sections comprising grooves so as to be seated on said latter said annular member.

12. The end capping machine of claim 11, said annular members and said grooves being tapered so as to provide seating means for said partible mold sections.

* * * * *